(12) United States Patent
Katchour et al.

(10) Patent No.: US 6,724,399 B1
(45) Date of Patent: Apr. 20, 2004

(54) METHODS AND APPARATUS FOR ENABLING KEYBOARD ACCELERATORS IN APPLICATIONS IMPLEMENTED VIA A BROWSER

(75) Inventors: Ernst Katchour, Saratoga, CA (US); Shankar S. Nathan, Koloa, HI (US)

(73) Assignee: Siebel Systems, Inc., San Mateo, CA (US)

( * ) Notice: Subject to any disclaimer, the term of this patent is extended or adjusted under 35 U.S.C. 154(b) by 81 days.

(21) Appl. No.: 09/967,467

(22) Filed: Sep. 28, 2001

(51) Int. Cl.[7] .................................................. G09G 5/00
(52) U.S. Cl. ........................ 345/740; 345/734; 345/736; 345/744; 345/812; 345/827
(58) Field of Search ................................. 345/708, 734, 345/735, 736, 744, 740, 762, 773, 812, 826, 827; 710/67

(56) References Cited

U.S. PATENT DOCUMENTS

| | | | | | |
|---|---|---|---|---|---|
| 5,790,117 A | * | 8/1998 | Halviatti et al. | ............ | 345/744 |
| 5,916,310 A | * | 6/1999 | McCain | ........................ | 710/67 |
| 5,973,688 A | * | 10/1999 | May | ............................ | 345/709 |
| 6,114,978 A | * | 9/2000 | Hoag | ............................ | 341/23 |
| 6,115,040 A | * | 9/2000 | Bladow et al. | ............. | 345/741 |

* cited by examiner

*Primary Examiner*—John Cabeca
*Assistant Examiner*—Cuong T. Thai
(74) *Attorney, Agent, or Firm*—James W. Soong; Siebel Systems, Inc.

(57) ABSTRACT

Methods, apparatus, and articles of manufacture for enabling keyboard accelerators in software applications implemented via a browser application are disclosed herein. Keyboard accelerators are enabled by intercepting keyboard data before it can be utilized by the browser application for its own purposes, such as initiation of a keyboard accelerator native to the browser application. The intercepted keyboard data is evaluated to determine whether it corresponds to a defined remote application keyboard accelerator, and if so, then a remote application function module is called to implement the feature mapped to the particular identified keyboard accelerator. The keyboard data may then be removed from an event queue or otherwise deleted such that the browser application continues to be executed without reference thereto.

35 Claims, 3 Drawing Sheets

METHODS AND APPARATUS FOR ENABLING KEYBOARD ACCELERATORS IN APPLICATIONS IMPLEMENTED VIA A BROWSER

TECHNICAL FIELD OF THE INVENTION

This disclosure relates to keyboard accelerators, and more particularly, but not exclusively, to methods, apparatus, and articles of manufacture for enabling keyboard accelerators in software applications implemented via a browser application.

BACKGROUND INFORMATION

Contemporary computer users typically have multiple input devices at their disposal, such as a keyboard, a mouse, a stylus, or the like, for interacting with a particular software application being executed by the computer's processor. These interactions may include inputting information or data for use by the software application, or the selection of certain functions or commands within the software application to format text, to open a new or existing file, or to save, copy, or print all or a portion of a document or file, or the like.

Often times, a software application will include a graphical user-interface ("UI"), providing a plurality of icons representing objects that can be manipulated by the user to control certain computer actions simply by "clicking" on the desired icon with the mouse, for example. For instance, a word processing software application may provide a graphical UI that includes an icon with a bold capital "B" to allow the user to toggle a boldface text attribute. Because many computer users find it less efficient to frequently move a hand from the keyboard to the mouse in order to click on a particular icon, and then reposition their hand on the keyboard to continue entering information, many software applications enable keyboard accelerators. Keyboard accelerators allow a user to initiate the same command or function, represented by the icon, by typing a particular key sequence, such as for example, "Ctrl+B." "Ctrl+B" is nearly universally used by Windows® applications as a toggle for the boldface text attribute. Simultaneously pressing the "Ctrl" key and the "B" key on the keyboard toggles the boldface text attribute on and off in the same manner as does repeatedly "clicking" the "B" icon, mentioned above. Similarly, particular keystroke combinations may be used to save a document or file (e.g., "Ctrl+S"), or to print a current document (e.g., "Ctrl+P"), or the like. Many such keystroke combinations may be defined as defaults, native to one or more applications "running" on a computer system.

Each input action ("event") taken by a user, such as a keystroke or a mouse-button click, is generally stored in a system event queue until it may be retrieved by the operating system or software application following the completion of any current operation. The reader will appreciate that in the context of modern operating systems, such as a Windows® operating system, several software applications may be "running" simultaneously. Consequently, the user must identify an active application for which inputs are intended. In the Windows® operating system for example, the active application corresponds to the active window selected by the user, and will receive the input from the user and carry out its functions accordingly.

In recent years, the proliferation of computers among the consuming public and within organizations has contributed to an increase in electronic commerce and intra-organizational procedures conducted via networks, such as the Internet, wide area networks ("WANs"), local area networks ("LANs"), intranets, or the like. As such, software applications are more frequently maintained at one location, and "served" to a plurality of end users, such as consumers or intranet users by a server or other computer system via the network. Hereinafter, these software applications will be referred to as "remote applications." In these situations, the remote application itself remains primarily stored in a memory or storage location accessible by the server, and end user interaction with the remote application is facilitated via communications transmitted over the network as packets of information. The packets of information enable implementation of the remote application via a browser application, typically stored locally on the end user's computer.

A browser application comprises software that allows an end user to view documents and access files and other software related to those documents by interpreting code (e.g., hyper text markup language "HTML," java, java script, or the like) transmitted over the network. While interacting with the remote application, the browser application comprises the active application "running" on the end user's computer. As such, user input, such as keystroke combinations and other events are treated as input to the browser application.

As a consequence of the foregoing, an end user interacting with the remote application via his or her browser application is, at best, limited in terms of using keyboard accelerators to accomplish tasks within the remote application because keystroke combinations will be retrieved by the browser application and used to implement its own functions. For example, a remote application provider may define a default keystroke sequence such as "Ctrl+N" to be associated with a command to open a new record. However, the browser application, through which the remote application is being implemented, will retrieve the keystroke sequence "Ctrl+N" from the event queue and open a new browser page, for example. While those key sequences not mapped to a native browser command may be used as keyboard accelerators for the remote application in some cases, various browser applications, or various versions of a particular browser application may have different key sequences mapped to different commands, thereby preventing the remote application provider from furnishing a common set of keyboard accelerators that will function effectively for all potential end users.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Embodiments of methods, apparatus, and articles of manufacture for enabling keyboard accelerators in software applications implemented via a browser application are described in detail herein. In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention enable keyboard accelerators in remote applications (e.g., applications implemented via a browser application on a client machine) by intercepting keyboard data before it can be utilized by the browser application, and using the keyboard data to initiate keyboard accelerator functions specific to the remote application. In one embodiment in accordance with the teachings of the present invention, events generated from a keyboard are monitored in a system event queue, where the events are maintained until the system or an active application can retrieve the events and act accordingly. By monitoring these events, embodiments of the present invention can determine whether the events correspond to any defined remote application keyboard accelerators, and if so, call remote application functions to carry out the objectives of the remote application. In one embodiment, the events corresponding to defined remote application keyboard accelerators are then removed from the system event queue so that the browser application never receives these events, and functions as if they never existed. Embodiments of the present invention may be implemented by providing a software module (e.g., an ActiveX control software program, plug-in software program, or the like) that may be downloaded to a client machine to carry out the methodologies in accordance with the teachings of the present invention. Other features of the illustrated embodiments will be apparent to the reader from the foregoing and the appended claims, and as the detailed description and discussion is read in conjunction with the accompanying drawings.

Figure 1:
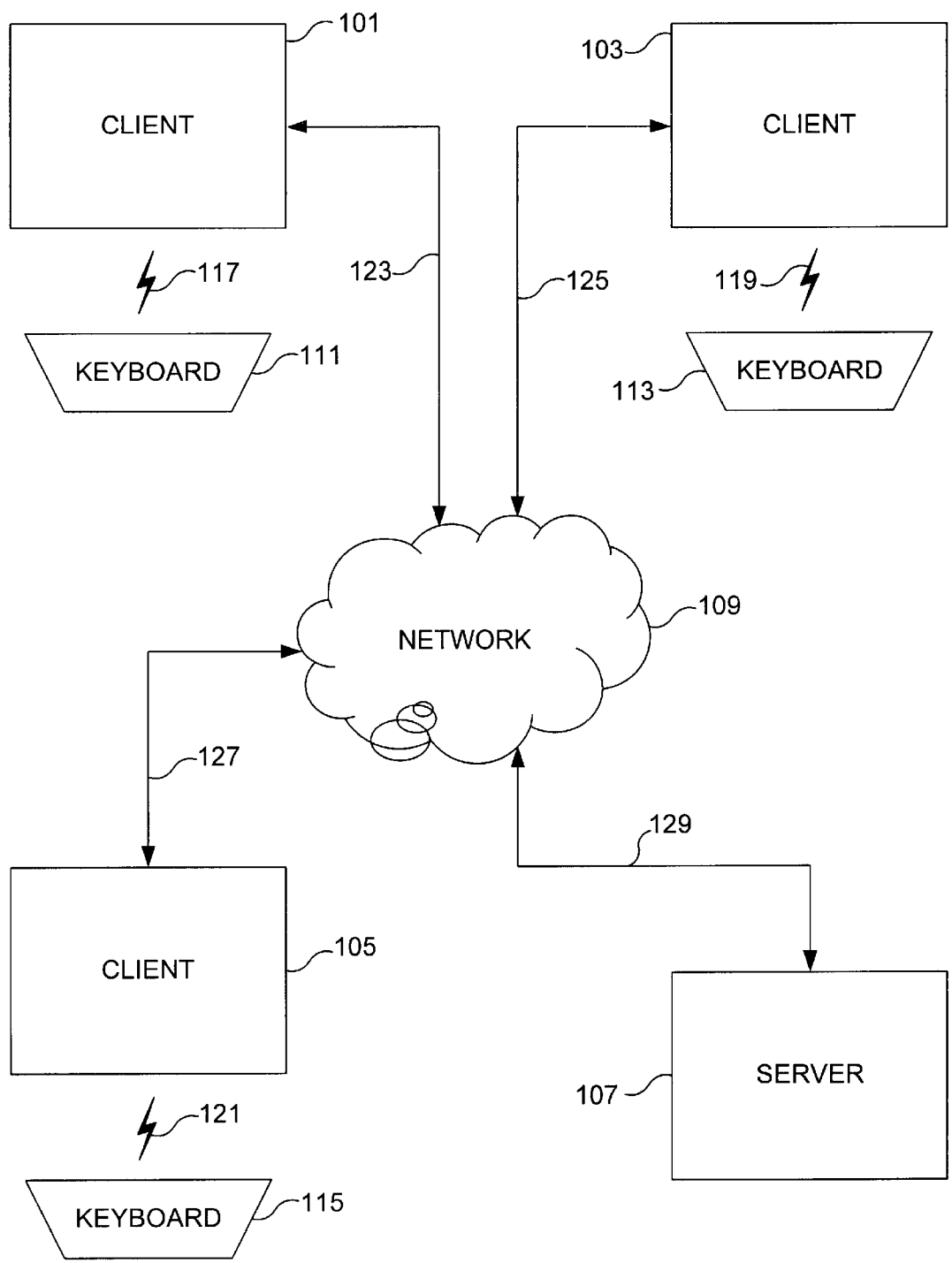
FIG. 1 is a block diagram illustrating one embodiment of a network environment in accordance with the teachings of the present invention.

With reference now to the drawings, and in particular to FIG. 1, there is illustrated a block diagram of one embodiment of a network environment in accordance with the teachings of the present invention. In one embodiment, a plurality of clients 101, 103, and 105 are capable of communicating with a server 107 via a network 109. The clients 101, 103, and 105 are capable of connecting to the network 109 via individual communication links 123, 125, and 127 respectively, while the server 107 is capable of connecting to the network 109 via a communication link 129.

In one embodiment, the communication links 123, 125, 127, and 129 may be used by the clients 101, 103, and 105, and the server 107, respectively, to send and/or receive information from one another. In one embodiment, the communication links 123, 125, 127, and 129 may comprise physical connections, such as for example, cables, wires, optical fibers, or the like. In another embodiment, the communication links 123, 125, 127, and 129 may comprise wireless links, such as for example, radio frequency links, satellite transmissions, optical signals, or the like, transmitted through the atmosphere, or any combination of the foregoing. In one embodiment, the network 109 may be any type of communications network through which a plurality of different devices may communicate, such as for example, but not limited to, the Internet, a WAN, a LAN, an intranet, or the like.

In one embodiment, the server 107 is configured to execute a plurality of machine instructions, which may be stored in a memory or other storage location within, or accessible by, the server 107. The plurality of machine instructions may comprise, in one embodiment, a remote application (as mentioned above, the application is referred to herein as a "remote application" because it is primarily stored at a location remote from the clients 101, 103, and 105, and is implemented by the clients 101, 103, and 105 via a separate active application, such as a browser application). The remote application may comprise any type of application software designed to be interacted with via a network connection, such as the network 109. In one embodiment, the remote application includes one or more function modules (also referred to herein as a "remote application function") to perform specific operations or features for the remote application. In one embodiment in accordance with the teachings of the present invention, the function modules comprise java script code and/or java code that is transmitted via the network 109 from the server 107 to one or more of the clients 101, 103, and 105.

In one embodiment, the server 107 further includes, or has access to, machine instructions comprising a keyboard enablement program. In one embodiment, the keyboard enablement program comprises an ActiveX control software program, a plug-in software program, or the like. In one embodiment, the keyboard enablement program is capable of being downloaded by one or more of the clients 101, 103, and 105, via the network 109, and the client's individual communication link 123, 125, and 127, respectively.

In one embodiment, each client 101, 103, and 105 is configured to execute a plurality of machine instructions, which may be stored in a memory or other storage location within, or accessible by, the client 101, 103, and 105. In one embodiment, the plurality of machine instructions may comprise an operating system and a plurality of software applications, including a browser application.

In one embodiment, each client 101, 103, and 105 is coupled to a keyboard 111, 113, and 115, respectively, via a keyboard link 117, 119, and 121, respectively. Each keyboard link 117, 119, and 121 enables signals corresponding to keystroke combinations, generated by a user (e.g., via key presses), to be communicated to the respective client 101, 103, and 105. Generally, each keystroke generates a signal that is sent to a keyboard controller (not shown) within the keyboard 111, 113, and 115. The keyboard controller manipulates the keystroke signal to generate a scan code uniquely identifying the key pressed by the user, and stores the scan code in a memory buffer (not shown) within the keyboard 111, 113, and 115, to be read by a basic input/output system ("BIOS") of the respective client 101, 103, and 105. The BIOS reads the scan code, translates the scan code into keyboard data (e.g., an American Standard Code for Information Interchange ("ASCII") code, or a special code corresponding to a function key, for example), and stores the keyboard data in an event queue, where it may be retrieved by the operating system or an application of the respective client 101, 103, and 105 for processing. In one embodiment, each element of keyboard data represents an event, which may, in combination with other events, represent a keyboard accelerator defined for a remote application and/or a keyboard accelerator native to a browser application being used to implement the remote application.

Figure 2:
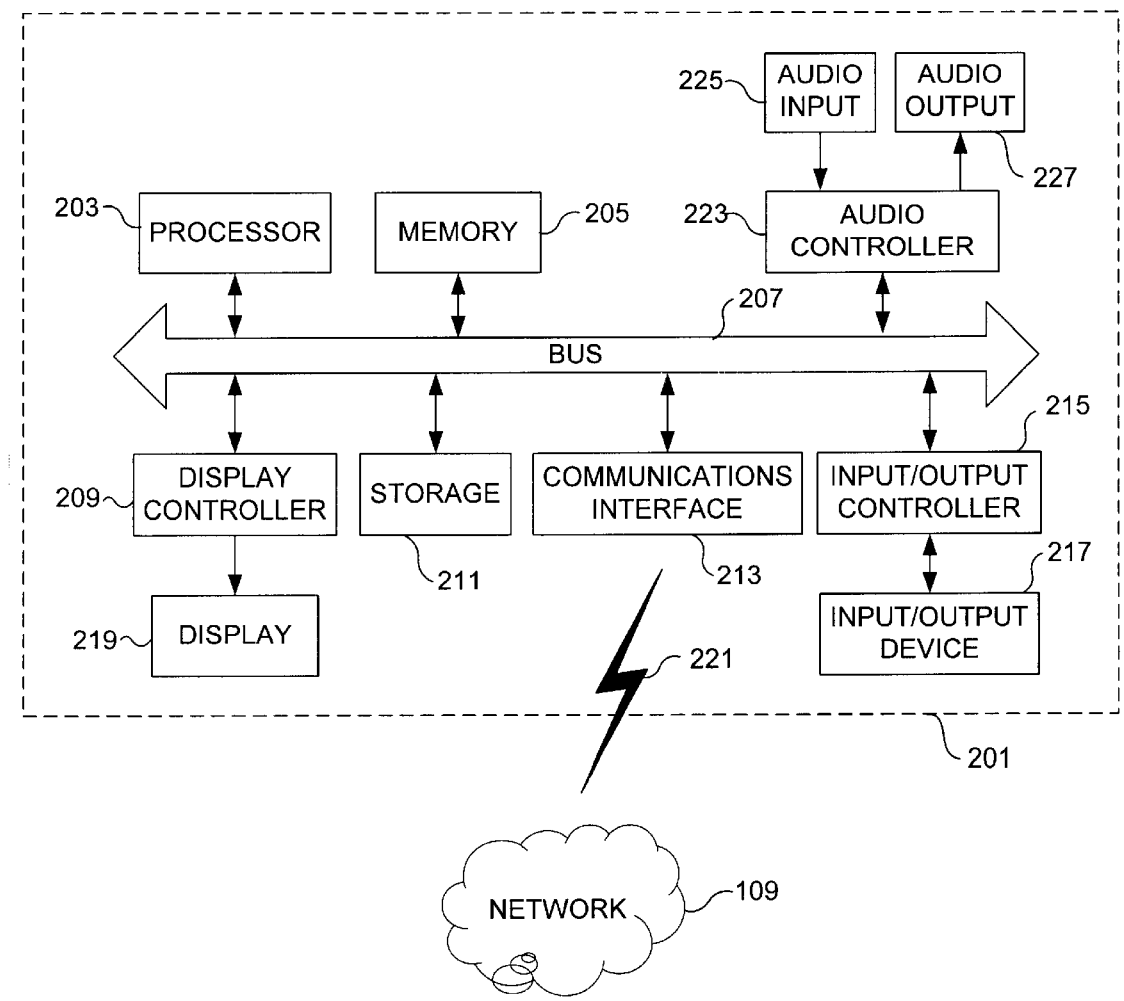
FIG. 2 is a block diagram of one embodiment of a computer system representative of a client or a server in accordance with the teachings of the present invention.

With reference now primarily to FIG. 2, a block diagram illustrating one embodiment of a machine 201 representative of the clients 101, 103, and 105, and/or the server 107 in accordance with the teachings of the present invention is shown. Typically, the clients 101, 103, and 105 may comprise various types of machines, including a desktop computer or a workstation, a laptop computer, or a personal computer, for example, while the server 107 may typically comprise a computer server or similar type of server hardware that is designed to communicate with a plurality of other machines. In one embodiment, the machine 201 is a computer that includes a processor 203 coupled to a bus 207. In one embodiment, a memory 205, a storage 211, a display controller 209, a communications interface 213, an input/output controller 215, and an audio controller 223 are also coupled to the bus 207.

In one embodiment, the machine 201 interfaces to external systems through the communications interface 213. The communications interface 213 may include a radio transceiver compatible with various modulated signals, wireless telephone signals, or the like. The communications interface 213 may also include an analog modem, Integrated Services Digital Network ("ISDN") modem, cable modem, Digital Subscriber Line ("DSL") modem, a T-1 line interface, a T-3 line interface, an optical carrier interface (e.g., OC-3), token ring interface, satellite transmission interface, a wireless interface, or other interfaces for coupling a device to other devices.

In one embodiment, a carrier wave signal 221 is received/transmitted between the communications interface 213 and the network 109. In one embodiment, the communications signal 221 may be used to interface the machine 201 with another computer system, a network hub, a router, or the like. In one embodiment, the carrier wave signal 221 is considered to be machine-readable media, which may be transmitted through wires, cables, optical fibers, or through the atmosphere, or the like.

In one embodiment, the processor 203 may be a conventional processor, such as for example, but not limited to, an Intel x86 processor, or Pentium family microprocessor, a Motorola family microprocessor, or the like. The memory 205 may be a machine-readable medium such as dynamic random access memory ("DRAM"), and may include static random access memory ("SRAM"). The display controller 209 controls, in a conventional manner, a display 219, which in one embodiment may be a cathode ray tube ("CRT"), a liquid crystal display ("LCD"), an active matrix display, a television monitor, or the like. An input/output device 217, coupled to the input/output controller 215 may be a keyboard, a disk drive, a printer, a scanner, or other input/output device, including a television remote, a mouse, a trackball, a trackpad, a joystick, or the like. In one embodiment, the audio controller 223 controls in a conventional manner an audio output 227, which may include for example, audio speakers, headphones, an audio receiver, an amplifier, or the like. In one embodiment, the audio controller 223 also controls, in a conventional manner, an audio input 225, which may include for example, a microphone, or input(s) from an audio or musical device, or the like.

The storage 211, in one embodiment, may include machine-readable media such as for example, but not limited to, a magnetic hard disk, a floppy disk, an optical disk, a read-only memory component ("ROM"), a smart card, or another form of storage for data. In one embodiment, the storage 211 may include removable media, read-only memory, readable/writable memory, or the like. Some of the data may be written by a direct memory access process into the memory 205 during execution of software in the computer system 201. It will be appreciated that software may reside in the storage 211, the memory 205, or may be transmitted or received via a modem or a communications interface 213. For the purpose of the specification, the term "machine-readable medium" shall be taken to include any medium that is capable of storing data, information, or encoding a sequence of instructions or operations for execution by the processor 203 to cause the processor 203 to perform the methodologies of the present invention. The term "machine-readable medium" shall be understood to include, for example, solid-state memories; ROM; random access memory ("RAM"); magnetic disk storage media; optical storage media; flash memory devices; electrical, optical, acoustical or other form of propagated signals (e.g., carrier tones, infrared signals, and digital signals); and the like.

With continued reference to FIGS. 1 and 2, in one embodiment in accordance with the teachings of the present invention, an end user of one of the plurality of clients 101, 103, and 105, may initiate a browser application stored in the memory 205, for example. Execution of the instructions comprising the browser application by the processor 203 may enable the client 101, 103, and 105 to connect to the network 109 via the communications interface 213, and the respective communication link 123, 125, and 127. Using a URL or other identifying specification, the client 101, 103, and 105 may link to a node on the network, such as the server 107, and submit a request for a page, for example, maintained by the server 107. The page itself may comprise an HTML file, and may, in one embodiment, include java script code and/or java code. In one embodiment, the java script code and/or java code comprises function modules associated with the remote application. The page, in one embodiment, may correspond to a portion of the remote application maintained by the server 107 in accordance with the teachings of the present invention, and may include references to the function modules and the keyboard enablement program.

In one embodiment, the server 107, in response to the request for a page submitted by the client 101, 103, and 105, may send an HTML page including function modules (e.g., java script code and/or java code) to the client 101, 103, and 105. The browser application, in one embodiment, may be configured to reassemble the HTML code for display (e.g., on the display 219) on the client 101, 103, and 105. The browser application may also include instructions for interpreting the java script code and/or the java code included with the HTML page. The end user of the client 101, 103, and 105 may then interact with the remote application either by selecting HTML hyperlinks embedded in the page, or by inputting events to initiate the java script code or java code programming.

In one embodiment, the server 107 also responds to the request from the client 101, 103, and 105 by sending the keyboard enablement program to the client 101, 103, and 105. As mentioned previously, the keyboard enablement program may comprise an ActiveX control software program, a plug-in software program, or the like. For purposes of the present explanation, a Windows® operating system and a Microsoft® Internet Explorer browser application will be presumed. In this context, the keyboard enablement program may comprise an ActiveX control written, for example, in a C++ programming language. In one embodiment, if the keyboard enablement program is not installed on the client 101, 103, and 105, then the browser application downloads the keyboard enablement program and stores it in a memory location (e.g., memory 205) in the client 101, 103, and 105 as a dynamic link library ("DLL") file, for example. In one embodiment in accordance with the teachings of the present invention, the HTML page(s) may reference the keyboard enablement program, as well as the function modules, to initiate calls to client-side methodologies or server-side methodologies. The reader will appreciate that depending on the browser application's configuration, it may be necessary for the end user to explicitly enable downloading of the keyboard enablement program.

Figure 3:
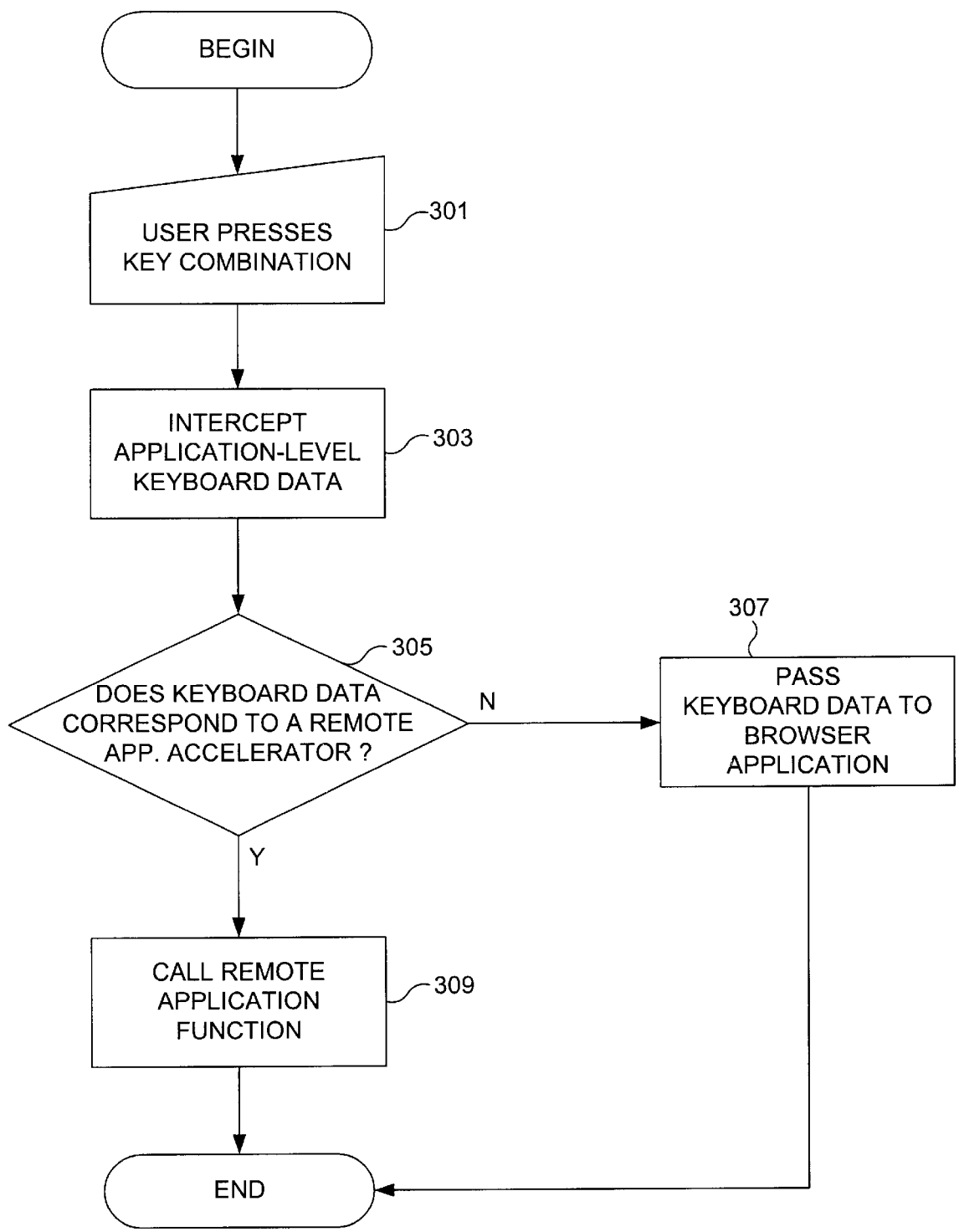
FIG. 3 is a flow diagram illustrating the flow of events in the implementation of one embodiment of the present invention.

Referring now primarily to FIG. 3, a flow diagram illustrating the flow of events in the implementation of one embodiment of the present invention is shown. When a user presses a key combination (see, e.g., process block 301), events are generated and maintained in the system event queue, as discussed previously. The events may comprise system-level events (e.g., system-level keyboard data), such as a key combination including "Ctrl+Alt+Del," which is familiar to many computer system users as a command to shut-down and reboot the computer system. In another embodiment, the events may comprise application-level events; events that are treated as input to the active application. The application-level events may include application-level keyboard data (e.g., a key combination including "Ctrl+N", for example) that may correspond to a keyboard accelerator, which in turn may be mapped to a function module.

In one embodiment in accordance with the teachings of the present invention, execution of the instructions comprising the keyboard enablement program by the processor 203 of the client 101, 103, and 105, causes the client to intercept application-level keyboard data (see, e.g., process block 303) before it can be retrieved by, or passed to, the active application (e.g., the browser application). In one embodiment, intercepting the application-level keyboard data comprises screening or monitoring all events in the system event queue in order to determine whether any of the application-level keyboard data corresponds to a defined remote application keyboard accelerator (see, e.g., process block 305). That keyboard data not corresponding to a defined remote application keyboard accelerator may then be passed to the browser application to be used for its own purposes (see, e.g., process block 307), which may also include a defined keyboard accelerator function native to the browser application. In one embodiment, if the keyboard data corresponds to a remote application keyboard accelerator (see, e.g., block 305), then a function module, mapped to the particular keyboard accelerator, is called to carry out the remote application feature (see, e.g., process block 309). In one embodiment, the function module called to carry out the remote application feature comprises a client-side methodology, executed by the processor 203 of the respective client 101, 103, and 105. In another embodiment, the function module called to carry out the remote application feature comprises a server-side methodology, executed by the processor 203 of the server 107.

For purposes of briefly illustrating the foregoing, assume that the keystroke combination "Ctrl+N" corresponds to a defined remote application keyboard accelerator mapped to a function in the remote application such as opening a new record, for example. When a user presses the key combination "Ctrl+N" (see, e.g., block 301), an event is generated and maintained in the system event queue. Unless this event is intercepted (see, e.g., block 303), it will be retrieved by the active application (e.g., the browser application) and used to open a new browser window, for example (assuming the "Ctrl+N" key combination corresponds to a native browser keyboard accelerator mapped to this browser function). When the "Ctrl+N" event is intercepted, it may be evaluated to determine whether or not it corresponds to a defined remote application keyboard accelerator (see, e.g., block 305). In this example, it does, and consequently, a remote application function may be called to implement the feature mapped to this keyboard accelerator (e.g., open a new record) (see, e.g., block 309). The remote application function may comprise a java script program, for example, included with the HTML page sent by the server 107, as discussed above. Execution of the remote application function may call methods on the client-side of the network link, or call methods on the server-side of the network link, to facilitate implementation of the mapped feature.

The reader will appreciate that any number of keystroke combinations may be defined as keyboard accelerators and mapped to specific functions in the remote application. For example, "Atl+C" may be defined as an accelerator mapped to a function to copy a record. In one embodiment of the present invention, keyboard accelerators may be defined to include special keys, such as function keys, arrow keys, or the like. Embodiments of the present invention also allow a remote application provider to leave untouched, those native browser keyboard accelerator functions that are particularly popular among users, such as for example, the keystroke combination "Ctrl+F," which, in popular browser applications, maps to a function that finds a text string on the current browser page. Moreover, these native browser features may function very well within the context of the interaction with the remote application.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A method, comprising:
    intercepting application-level keyboard data, including keyboard data corresponding to keyboard accelerators native to a browser application, the browser application capable of implementing a remote application, wherein intercepting occurs before the data is acquired by the browser application;
    determining if the keyboard data corresponds to a defined remote application keyboard accelerator;
    calling a remote application function if in the keyboard data corresponds to a defined remote application keyboard accelerator; and
    transferring the keyboard data to the browser application if in the keyboard data fails to correspond to a defined remote application keyboard accelerator.

2. The method of claim 1, wherein the keyboard data comprises codes corresponding to keystroke sequences, including special keys.

3. The method of claim 1, wherein intercepting application-level keyboard data comprising screening all events in an event queue.

4. The method of claim 1, further comprising deleting the keyboard data prior to retrieval by the browser application.

5. The method of claim 1, wherein the remote application function comprises a software program written in a programming language selected from a group including java script and java.

6. The method of claim 1, wherein the remote application function comprises a client-side methodology.

7. The method of claim 1, wherein the remote application function comprises a server-side methodology.

8. A method, comprising:
monitoring events in a system event queue;
identifying an event corresponding to a defined remote application keyboard accelerator, wherein the event further corresponds to a keyboard accelerator native to a browser application;
calling a function module, the function module mapped to the defined remote application keyboard accelerator; and
removing the event from the system event queue in response to the browser application failing to receive the event.

9. The method of claim 8, wherein the function module comprises a software program written in a programming language selected from a group including java script and java.

10. The method of claim 8, wherein the event comprises application-level keyboard data.

11. The method of claim 8, wherein the event is removed from the system event queue prior to retrieval by the browser application.

12. The method of claim 8, wherein the function module comprises a client-side methodology.

13. The method of claim 8, wherein the function module comprises a server-side methodology.

14. An apparatus, comprising:
a processor;
a memory, coupled to the processor, to store a plurality of machine instructions; and
a communications interface, coupled to the processor, and capable of connecting to a network via a communication link; and
wherein execution of the machine instructions by the processor causes the apparatus;
to intercept application-level keyboard data, including keyboard data corresponding to keyboard accelerators native to a browser application being executed by the processor, wherein intercepting occurs before the data is acquired by the browser application;
to determine if the keyboard data corresponds to a defined remote application keyboard accelerators;
to call a remote application function in response to a determination that the keyboard data corresponds to the defined remote application keyboard accelerator; and
transfer the keyboard data to the browser application if keyboard data fails to correspond to a defined remote application keyboard accelerator.

15. The apparatus of claim 14, wherein the keyboard data comprises codes corresponding to keystroke sequences, including special keys.

16. The apparatus of claim 14, wherein to intercept application-level keyboard data comprises executing instructions to monitor events in a system event queue.

17. The apparatus of claim 14, wherein execution of the machine instructions by the processor further causes the apparatus to delete the keyboard data prior to identification of the keyboard data by the browser application.

18. The apparatus of claim 14, wherein the remote application function comprises a set of machine readable instructions written in a programming language selected from the group including java script code and java code.

19. An apparatus, comprising:
a processor;
a memory, coupled to the processor, to store a plurality of machine instructions; and
a communications interface, coupled to the processor, and capable of connecting to a network via a communication link; and
wherein execution of the machine instructions by the processor causes the apparatus to monitor events in a system event queue, to identify an event corresponding to a defined remote application keyboard accelerator, wherein the event further corresponds to a keyboard accelerator native to a browser application, to call a function module, the function module mapped to the defined remote application keyboard accelerator, and to remove the event from the system event queue, wherein the browser application fails to receive the event.

20. The apparatus of claim 19, wherein the function module comprises a software program written in a programming language selected from a group including java script and java.

21. The apparatus of claim 19, wherein the event comprises application-level keyboard data.

22. The apparatus of claim 19, wherein execution of the machine instructions by the processor causes the apparatus to remove the keyboard data prior to identification of the keyboard data by the browser application.

23. An article of manufacture, comprising:
a machine-readable medium that provides instructions, which, when executed by a machine, cause the machine to:
intercept application-level keyboard data, including keyboard data corresponding to keyboard accelerators native to a browser application, the browser application capable of implementing a remote application, wherein intercepting occurs before the data is acquired by the browser application;
determine if the keyboard data corresponds to a defined remote application keyboard accelerator; and
calling the remote application function if the keyboard data corresponds to a defined remote application keyboard accelerator; and
transferring the keyboard data to the browser application if in the keyboard data fails to correspond to a defined remote application keyboard accelerator.

24. The article of manufacture of claim 23, wherein the keyboard data comprises codes corresponding to keystroke sequences, including special keys.

25. The article of manufacture of claim 23, wherein to intercept application-level keyboard data comprises screening all events in an event queue.

26. The article of manufacture of claim 23, wherein the remote application function comprises a software program written in a programming language selected from a group including java script and java.

27. The article of manufacture of claim 23, wherein the machine-readable medium, further provides instructions, which, when executed by the machine, further cause the machine to delete the keyboard data prior to retrieval by the browser application.

28. The article of manufacture of claim 23, wherein the instructions comprise an ActiveX control software program.

29. The article of manufacture of claim 23, wherein the instructions comprise a plug-in software program.

30. An article of manufacture, comprising:
 a machine-readable medium that provides instructions, which, when executed by a machine, cause the machine to:
  monitor events in a system event queue;
  identify an event corresponding to a defined remote application keyboard accelerator, wherein the event further corresponds to a keyboard accelerator native to a browser application;
  call a function module, the function module mapped to the defined remote application keyboard accelerator; and
  remove the event from the system event queue, wherein the browser application fails to receive the event.

31. The article of manufacture of claim 30, wherein the function module comprises a software program written in a programming language selected from a group including java script and java.

32. The article of manufacture of claim 30, wherein the event comprises application-level keyboard data.

33. The article of manufacture of claim 30, wherein the event is removed from the system event queue prior to retrieval by the browser application.

34. The article of manufacture of claim 30, wherein the instructions comprise an ActiveX control software program.

35. The article of manufacture of claim 30, wherein the instructions comprise a plug-in software program.

* * * * *